(12) United States Patent
Whitta

(10) Patent No.: US 12,371,238 B2
(45) Date of Patent: Jul. 29, 2025

(54) SHELVING COMPONENTS TREE SYSTEM AND METHOD

(71) Applicant: CREATIVE PLASTIC CONCEPTS, LLC, Sycamore, OH (US)

(72) Inventor: Jacob H. Whitta, Bluffton, OH (US)

(73) Assignee: CREATIVE PLASTIC CONCEPTS, LLC, Sycamore, OH (US)

( * ) Notice: Subject to any disclaimer, the term of this patent is extended or adjusted under 35 U.S.C. 154(b) by 9 days.

(21) Appl. No.: 18/426,974

(22) Filed: Jan. 30, 2024

(65) Prior Publication Data

US 2024/0278967 A1   Aug. 22, 2024

Related U.S. Application Data

(60) Provisional application No. 63/486,271, filed on Feb. 22, 2023.

(51) Int. Cl.
*B65D 69/00* (2006.01)
*B29D 99/00* (2010.01)

(52) U.S. Cl.
CPC ......... *B65D 69/00* (2013.01); *B29D 99/0096* (2013.01)

(58) Field of Classification Search
CPC ..... B65D 69/00; B65D 71/00; B29D 99/0096
USPC .................................. 206/216, 223
See application file for complete search history.

(56) References Cited

U.S. PATENT DOCUMENTS

| | | | | |
|---|---|---|---|---|
| 5,568,862 A | * | 10/1996 | Black, Jr. ............... | B65D 71/02 206/338 |
| 5,902,340 A | * | 5/1999 | White ...................... | A61F 2/36 623/23.15 |
| 2016/0152383 A1 | * | 6/2016 | Pitts ...................... | B65D 35/245 206/486 |
| 2018/0044081 A1 | * | 2/2018 | O'Brien ................. | B65D 71/50 |

\* cited by examiner

*Primary Examiner* — Jacob K Ackun
(74) *Attorney, Agent, or Firm* — Thompson Coburn LLP

(57) ABSTRACT

Articles of manufacture, systems, and methods for arranging and securing a plurality of components used to assemble a product are provided. A component tree may include a plurality of components. The plurality of components may include an interlocking tee, a top cap, an adjustable foot, a foot adjuster and a wall bracket. A plurality of connecting means configured to couple each component of the plurality of components to an adjacent component of the plurality of components may be included. The plurality of components may be sequentially positioned along a length of the component tree in a predetermined order.

20 Claims, 10 Drawing Sheets

SHELVING COMPONENTS TREE SYSTEM AND METHOD

CROSS-REFERENCE TO RELATED APPLICATIONS

This application claims the benefit of U.S. Provisional Application No. 63/486,271, filed on Feb. 22, 2023. The entire disclosure of the above application is incorporated herein by reference.

FIELD

The present technology provides articles of manufacture, systems, and methods that relate to assembling a product, and, more particularly, to ways for forming, organizing, and securing a plurality of components used in the assembly of a product, such as a shelf product.

INTRODUCTION

This section provides background information related to the present disclosure which is not necessarily prior art.

Products are shipped around the world daily to provide consumers with products in a quick and efficient manner. Often, products require assembly upon arrival at their destination in order to make the shipping process more efficient and to prevent damage to the products. Commonly, these products include a multitude of small components such as caps, connectors, inserts, and other fittings.

Protocols are put in place to ensure the correct number of small components are included with each product prior to shipping. However, these protocols are often cumbersome and require additional time and resources. Moreover, parts often go missing despite these protocols, thereby leaving consumers with products that must be returned. This can be time consuming and inconvenient for both the consumer and the manufacturer.

Assembling a product including multiple small components may also be tedious and frustrating. Where components are included with the product. but not otherwise organized, the consumer may be required to count and sort such components during assembly. This can be difficult for components that are confusingly similar in size and/or appearance. Likewise, components are often small and easy to misplace during assembly. This can lead to time wasted searching for components during assembly. Undesirably, this can further lead to having to return the product or wait for a replacement part to be sent from the manufacturer if the components are not found.

Loose components may increase the likelihood that one or more components included in the packaging may become damaged during transport. Even minor damage to a small component can prevent proper assembly of a product and/or render the product unsafe once assembly is complete. As such, components necessary to assemble the product may require excessive packaging that is inefficient and wasteful in order to militate against damage to the components during transport.

Accordingly, there is a continuing need for articles of manufacture, systems, and methods that resiliently arrange and secure a plurality of components for assembling a product during transport, and that are easy to use for a consumer. Ideally, the articles of manufacture, systems, and methods ensure that the shipping and assembly of the product, including the plurality of components, is easy, efficient, and cost-effective for both the consumer and the manufacturer.

SUMMARY

In concordance with the instant disclosure, articles of manufacture, systems, and methods that resiliently arrange and secure a plurality of components for assembling a product during transport, are easy to use for a consumer, and that ensure that the shipping and assembly of the product, including the plurality of components, is easy, efficient, and cost-effective for both the consumer and the manufacturer, have surprisingly been discovered.

The present technology includes articles of manufacture, systems, and processes that relate to a product for resiliently arranging and securing a plurality of components for assembling a product. Each component may be individually disconnected from the product to assemble the product, as needed. The components may be collectively organized and secured in a convenient location where a user may easily access them in a predetermined order.

In certain embodiments, a component tree may include a plurality of components. The plurality of components may include an interlocking tee, a top cap, an adjustable foot, a foot adjuster and a wall bracket. A plurality of connecting means configured to couple each component of the plurality of components to an adjacent component of the plurality of components may be included. The plurality of components may be sequentially positioned along a length of the component tree in a predetermined order.

In certain embodiments, a method of using a component tree includes a first step of providing a component tree. The component tree may include a plurality of components. The plurality of components may include an interlocking tee, a top cap, an adjustable foot, a foot adjuster and a wall bracket. A plurality of connecting means configured to couple each component of the plurality of components to an adjacent component of the plurality of components may be included. The plurality of components may be sequentially positioned along a length of the component tree in a predetermined order. Additional steps may include removing the interlocking tee, installing the interlocking tee, removing the top cap, installing the top cap, removing the adjustable foot, installing the adjustable foot, removing the foot adjuster, installing the foot adjuster, removing the wall bracket, and installing the wall bracket.

In certain embodiments, a method for manufacturing a component tree includes a first step of providing a single component tree mold. Additional steps may include providing a material, introducing the material into the component tree mold, permitting the material to harden into the component tree, and removing the component tree from the component tree mold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
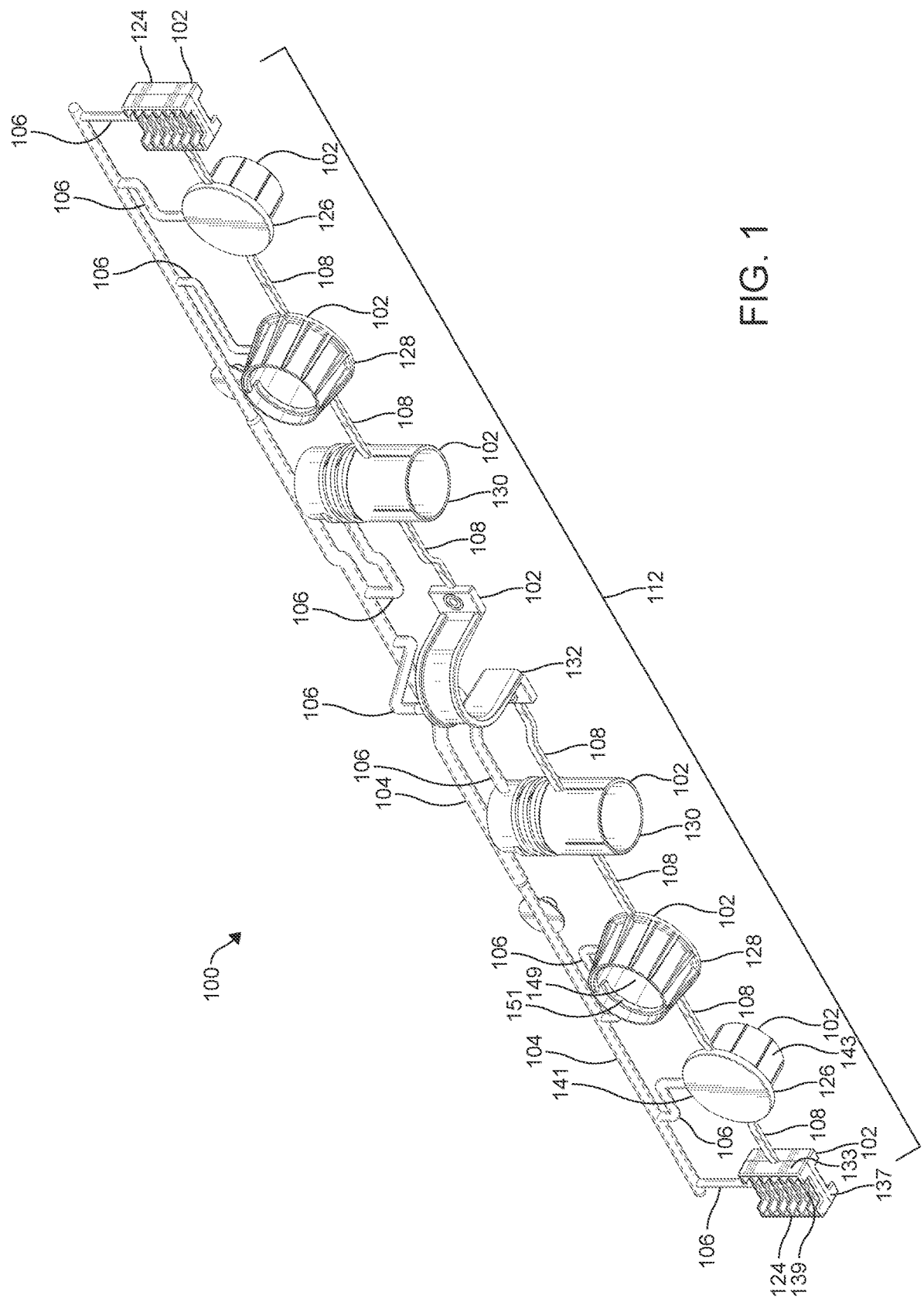
FIG. 1 is a top perspective view of a shelving component tree, according to certain embodiments of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the product is present; a plurality of such products may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed products.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to articles of manufacture, systems, and methods for arranging and securing a plurality of components used to assemble a product. More specifically, the plurality of components may be removably secured to a component tree to ensure that the shipping and assembly of the product, using the plurality of components, is easy, efficient, and cost-effective for both a user and a manufacturer. Example embodiments of the present technology are provided with reference to FIGS. 1-10 enclosed herewith.

With reference to FIGS. 1-6 a component tree 100 may include one or more components 102 configured to be used during assembly of a product. The components 102 may be removably connected to a primary connector 104 of the component tree 100 using one or more secondary connectors 106 extending outwardly from the primary connector 104. As shown, a portion of each secondary connecting element 106 may run in a generally vertical direction depending from the primary connector 104. Each component 102 may be removably connected to one or more adjacent components 102 using one or more tertiary connectors 108. As shown, the tertiary connectors 108 may run in a generally horizontal direction between adjacent components 102. One or more of the primary connector 104, the secondary connectors 106, and the tertiary connectors 108 may be used to stabilize and support the components 102 of the component tree 100, organize and secure the components 102, and prevent premature separation of the components 102 with respect to the primary connector 104 and with respect to the other components 102 included on the component tree 100. It should be appreciated that a skilled artisan may select any desirable number and configuration of components 102, primary connector 104, secondary connectors 106, and tertiary connectors 108 within the scope of the present disclosure.

Each of the secondary connectors 106 and the tertiary connectors 108 may be integrally formed with one or more of the components 102 and may have a connecting end 109 configured to couple to a component 102. In certain embodiments, a portion of any given secondary connector 106 may include a circular cross-section. Any given tertiary connector 108 may include a polygonal cross-section. In certain embodiments, any given secondary connector 106 may include both a portion having a circular cross-section and a portion having a polygonal cross-section. One of ordinary skill in the art may select any suitable shape and configuration for the secondary connectors 106 and the tertiary connectors 108, as desired.

Figure 5:
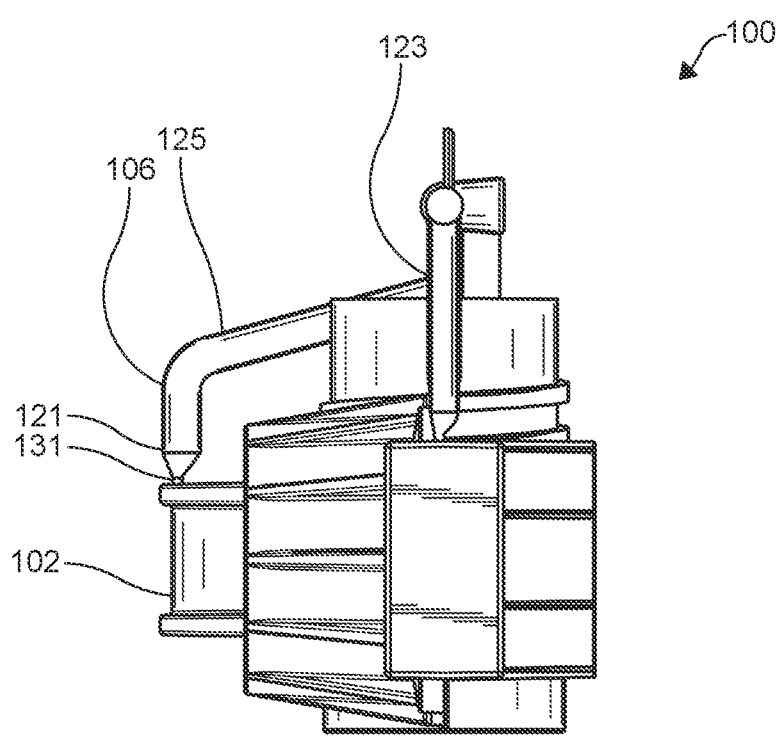
FIG. 5 is a right-side elevational view thereof.
Figure 6:
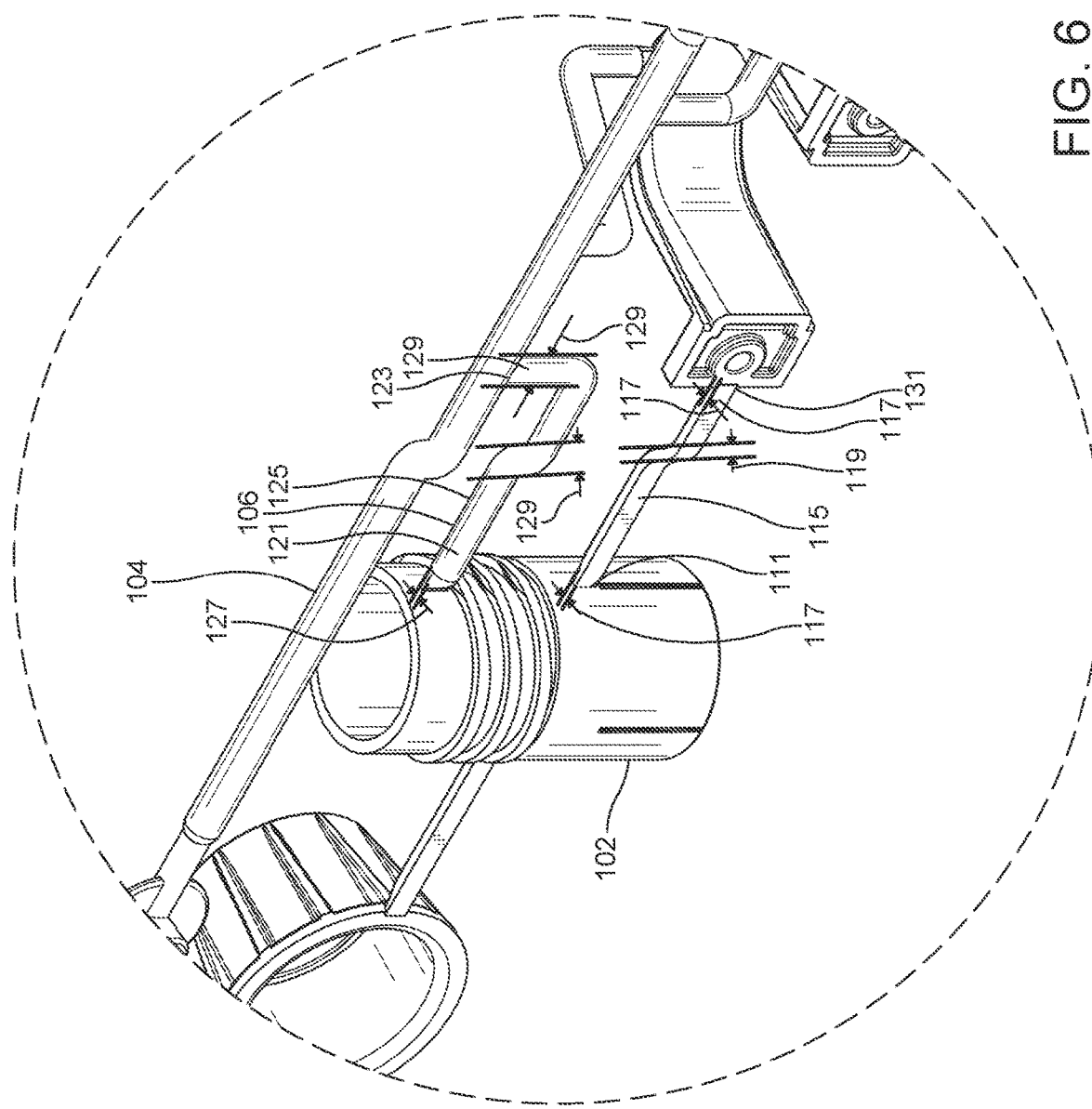
FIG. 6 is an enlarged view of a section of a component tree mold, according to certain embodiments of the present disclosure.

In certain embodiments, any given tertiary connectors 108 may include a first connecting end 111, a second connecting end 113 positioned opposite the first connecting end 111, and a central portion 115 disposed therebetween. Each of the first connecting end 111 and the second connecting end 113 may have a first width 117 that is smaller than a second width 119 of the central portion 115 of the tertiary connector 108, as shown in FIGS. 5 and 6. Any given secondary connectors 106 may include a first connecting end 121, a second connecting end 123 positioned opposite the first connecting end 121, and a central portion 125 disposed therebetween. The first connecting end 121 may have a first width 127 that is smaller than a diameter 129 of the central portion 125 and the second connecting end 123 of the tertiary connector 108, as shown in FIGS. 5 and 6. As a result, each of the first connecting end 111 of the tertiary connector 108, the second connecting end 113 of the tertiary connector 108, and the first connecting end 121 of the secondary connector 106 may be more narrow at a point of attachment 131 with each component 102, thereby allowing a user to more easily separate each component 102 from adjacent secondary connectors 106 and from tertiary connectors 108 at the point of attachment 131 when removing the component 102 from the component tree 100.

The component tree 100 may be fabricated using any suitable durable material or combination of materials. As non-limiting examples, the component tree 100 may be formed from various polyolefins and mixtures thereof, including polypropylene, high density polyethylene (HDPE), and/or polyethylene terephthalate (PET). One of ordinary skill in the art may select other suitable materials for forming the component tree 100 within the scope of the present disclosure. The choice of material may be based on the requirements for strength, durability, and cost-effectiveness, as non-limiting examples.

Likewise, the component tree 100 may be fabricated using any suitable means, such as injection molding, as one non-limiting example. The components 102 of the component tree 100 may be integrally molded with one another. Other non-limiting examples may include thermoforming, compression molding, blow molding, 3D printing, rotational molding, Computer Numerical Control (CNC) machining, and casting. A skilled artisan may select any suitable means for producing the component tree 100.

Figure 7:
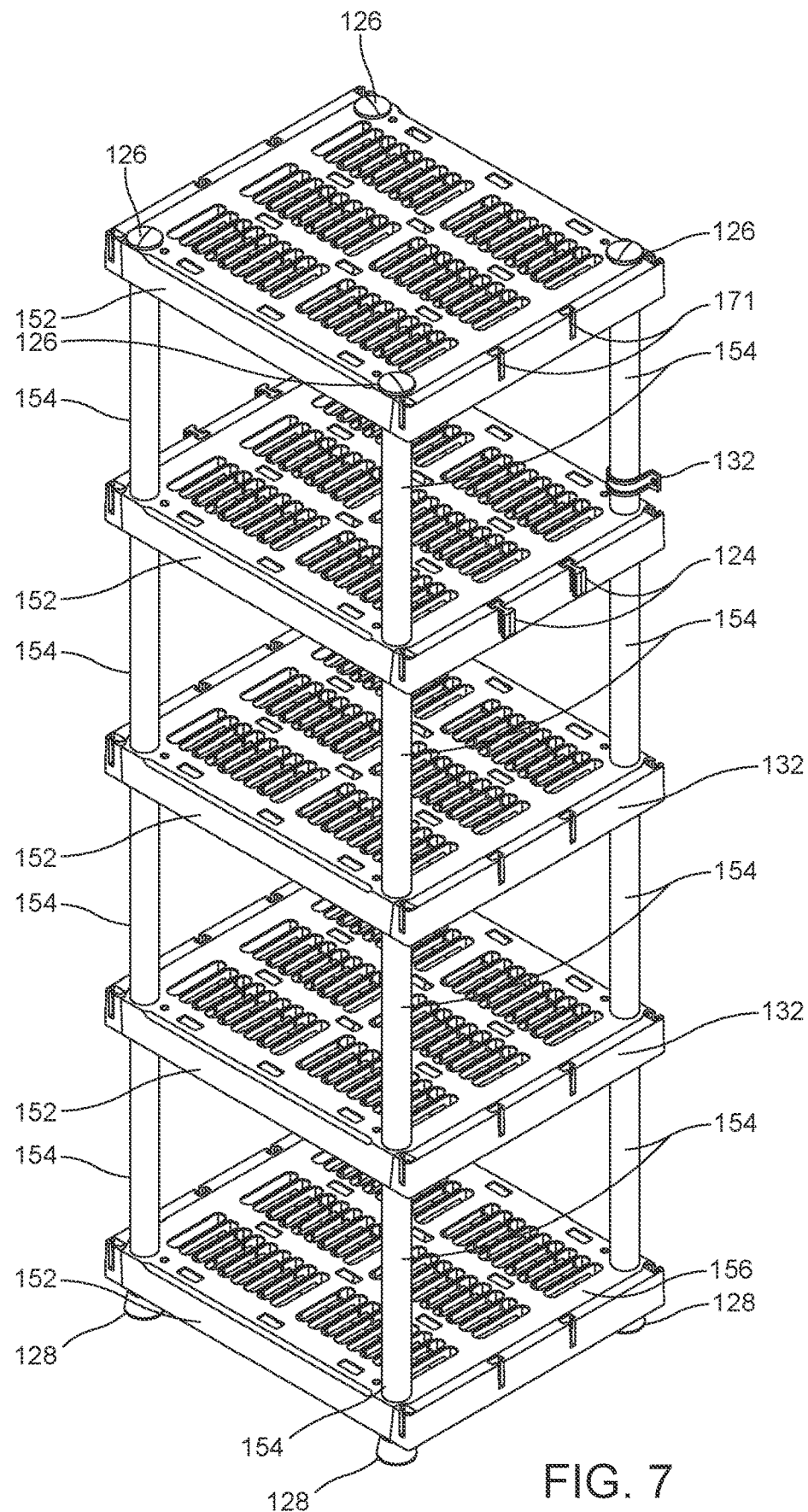
FIG. 7 is a top perspective view of a shelf product including components from a component tree, according to certain embodiments of the present disclosure.

According to certain embodiments, each component 102 of the component tree 100 may be the same, or the component tree 100 may include a plurality of different components 102 having different shapes, sizes, and/or configurations, as well as multiple copies of the different components. The component tree 100 may include some or all of the components 102 needed to assemble one or more products. For example, the component tree 100 may include components 102 used to assemble a shelf product 110, as shown in FIG. 7.

Figure 2:
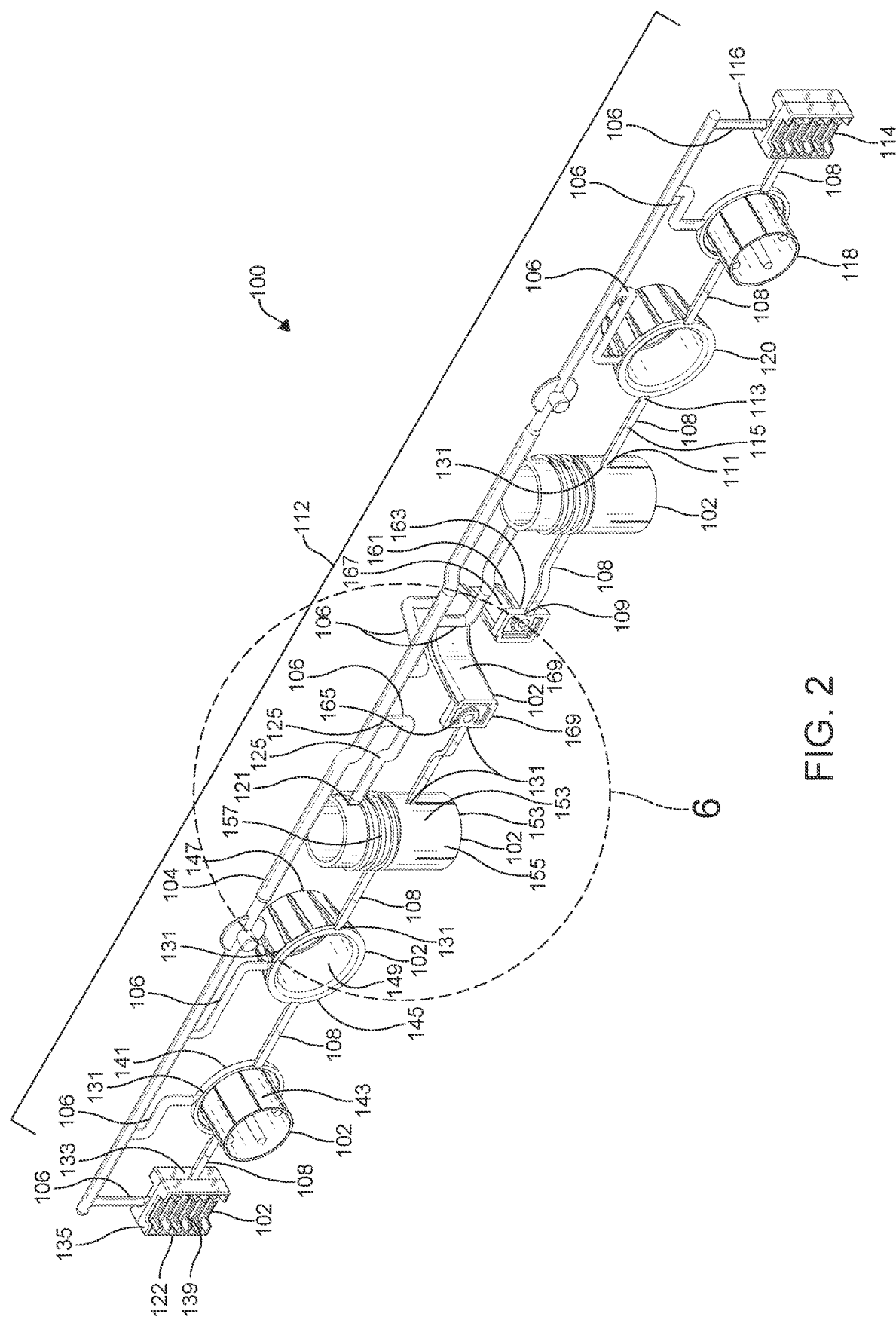
FIG. 2 is a bottom perspective view thereof.
Figure 3:
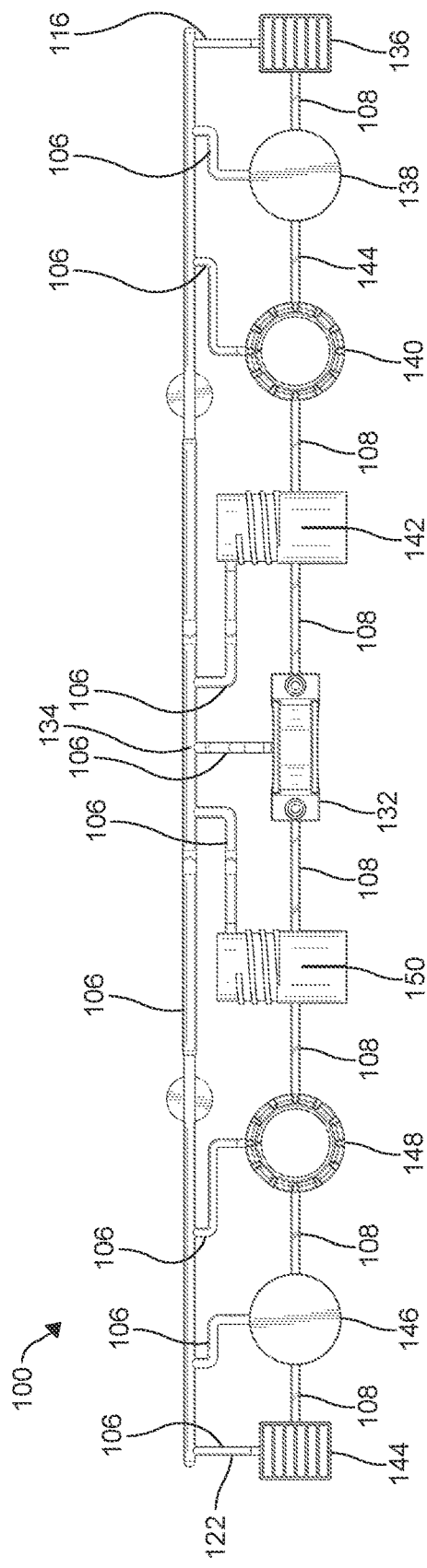
FIG. 3 is a front elevational view thereof.
Figure 4:
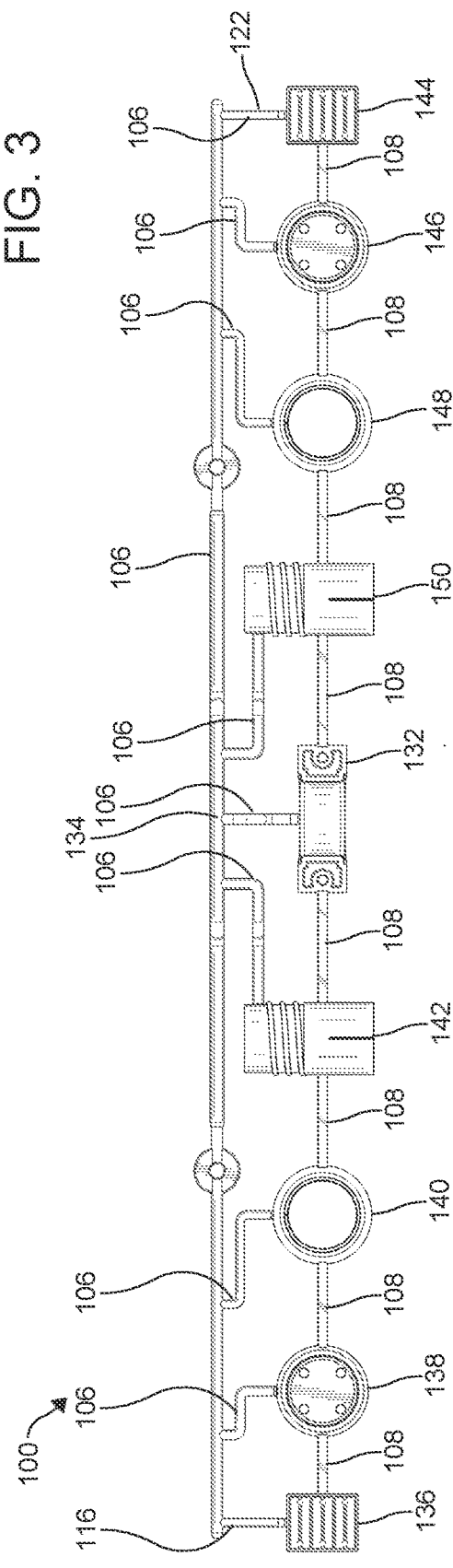
FIG. 4 is a rear elevational view thereof.

The components 102 may be sequentially located along a length 112 of the component tree 100 such that the components 102 may be accessible to a user in a predetermined order. Advantageously, having the components 102 sequentially located along the length 112 of the component tree 100 may allow for easy and efficient assembly of a product. In certain embodiments, as shown in FIG. 2, an outermost first component 114 positioned at a first end 116 of the component tree 100 may be first separated from the component tree 100 for use in assembling a product, followed by a second component 118 positioned adjacent to and inwardly from the first component 114. Next a third component 120 positioned adjacent to the second component 118 and inwardly from each of the second component 118 and the first component 114 may be separated from the component tree, and so on down a length 112 of the component tree 100, including any intermediate point or an entirety from the first end 116 to a second end 122 of the component tree 100. In this way, the components 102 may be separated or disconnected from the component tree 100 in a predetermined order, as needed, with no loose components 102 scattered or lost during assembly. Advantageously, the sequential order of the components 102 along the length 112 of the component tree 100 may further facilitate correct assembly and optimize compliance with assembly instructions and steps. A skilled artisan may arrange the components 102 in any suitable order along the length 112 of the component tree 100 to facilitate ease of use in cooperation with predetermined assembly instructions and steps.

In a more particular embodiment, the component tree 100 may include an interlocking tee 124, a top cap 126, an adjustable foot 128, a foot adjuster 130, and a wall bracket 132. The interlocking tee 124 may have an I-beam or H-beam shape and may have a sidewall 133, a bottom end 137, a top end 135, and a central recessed portion 139 disposed therebetween and configured to be received through a channel 171 of a product. The top cap 126 may include a top element 141 and a protrusion 143 extending outwardly from the top element 141 and configured to be received by an opening (not shown) in a product. The adjustable foot 128 may include a circular base section 145 with a cylindrical sidewall 147 extending outwardly therefrom. The cylindrical sidewall 147 may have an internal surface 149 including a threaded portion 151 configured to couple to a foot adjuster 130. The foot adjuster 130 may include a cylindrical body 153. The cylindrical body 153 may have an external surface 155 including a threaded portion 157 configured to couple to the adjustable foot 128 and a non-threaded portion 159. The wall bracket 132 may have a semi-cylindrical body 161 disposed between a first end 163 configured to be connected to a wall or other flat surface (not shown) and a second end 165 configured to be connected to the wall or other flat surface (not shown). The wall bracket 132 may include an outer surface 167 and an inner surface 169 configured to abut a product and the wall or other flat surface to which the product is secured using the wall bracket 132.

Advantageously, the point of attachment 131 between each component 102 and each connecting end 109 may be disposed on each component 102 such that the component 102 may not be damaged or otherwise rendered unusable with respect to a product when the component 102 is separated from adjacent secondary connectors 106 and tertiary connectors 108. More specifically, each point of attachment 131 between the interlocking tee 124 and adjacent secondary connectors 106 and tertiary connectors 108 may be disposed on one or more of the sidewalls 133, the bottom end 137, and the top end 135, thereby militating against damage to the central recessed portion 139 disposed therebetween and configured to be received through a channel 171 of a product. Likewise, each point of attachment 131 between the top cap 126 and adjacent secondary connectors 106 and tertiary connectors 108 may be disposed on the top element 141 thereby militating against damage to the protrusion 143 extending outwardly from the top element 141 and configured to be received by an opening (not shown) disposed in a product. Each point of attachment 131 between the adjustable foot 128 and adjacent secondary connectors 106 and tertiary connectors 108 may be disposed on the circular base section 145 thereby militating against damage to the cylindrical sidewall 147 configured to couple to a foot adjuster 130. Each point of attachment 131 between the foot adjuster 130 and adjacent secondary connectors 106 and tertiary connectors 108 may be disposed on the non-threaded portion 159 of the cylindrical body 153 thereby militating against damage to the threaded portion 157 of the cylindrical body 153 configured to be coupled to the adjustable foot 128. Finally, each point of attachment 131 between the wall bracket 132 and adjacent secondary connectors 106 and tertiary connectors 108 may be disposed on the outer surface 167 thereby militating against damage to the inner surface 169 configured to abut a product and/or the wall or other flat surface to which the product is secured.

The wall bracket 132 may be located at an approximate center 134 of the component tree 100. The component tree 100 may include a first interlocking tee 136, a first top cap 138, a first adjustable foot 140, and a first foot adjuster 142 at the first end 116 of the component tree 100 and a second interlocking tee 144, a second top cap 146, a second adjustable foot 148, and a second foot adjuster 150 at a second end 122 of the component tree 100. The first interlocking tee 136, the first top cap 138, the first adjustable foot 140, and the first foot adjuster 142 at the first end 116 of the component tree 100 may be separated from the second interlocking tee 144, the second top cap 146, the second adjustable foot 148, and the second foot adjuster 150 at the second end 122 of the component tree 100 by the wall bracket 132 located at an approximate center 134 of the component tree 100. The user may remove the components 102 in a predetermined order.

As one example, the user may remove the components 102 starting at each of the first end 116 and second end 122 of the component tree 100 and continue inwardly therefrom toward the wall bracket 132 located at the approximate center 134 of the component tree 100. It should be appreciated that the component tree 100 may include any suitable number and configuration of components 102 in any predetermined order, as determined by one of skill in the art.

In certain embodiments, the components 102 may be sequentially located along the length 112 of the component tree 100 such that an interlocking tee 124 may be used first to assemble the product, a top cap 126 may be used second to assemble the product, an adjustable foot 128 may be used third to assemble the product, a foot adjuster 130 may be used fourth to assemble the product, and a wall bracket 132 may be used fifth to assemble the product.

In a more particular embodiment, the components 102 may be sequentially located along the length 112 of the component tree 100 such that an interlocking tee 124 disposed at the first end 116 and an interlocking tee 124 disposed at the second end 122 may be used first to assemble the product, a top cap 126 disposed at the first end 116 and a top cap 126 disposed at the second end 122 may be used second to assemble the product, an adjustable foot 128 disposed at the first end 116 and an adjustable foot 128 disposed at the second end 122 may be used third to assemble the product, a foot adjuster 130 disposed at the first end 116 and foot adjuster 130 disposed at the second end 122 be used fourth to assemble the product, and a wall bracket 132 disposed at the approximate center 134 may be used fifth to assemble the product. It should be appreciated that the components 102 may be located in any appropriately desired position along the length of the component tree 100.

The tertiary connectors 108 in the component tree 100 may serve to secure and organize the components 102 of the component tree 100 and prevent premature separation of one or more components 102 from the component tree 100 and from adjacent components 102. Each tertiary connecting element 108 positioned between each component 102 may cooperate with one or more secondary connectors 106 and may facilitate a predetermined order of separation of each component 102 from the component tree 100.

In certain embodiments, the component tree 100 may include components 102 configured to be used during assembly of a product, and each component 102 may be removably connected to one or more adjacent components 102 using only tertiary connectors 108. The primary connector 104 and the secondary connectors 106 may be removed from the component tree 100, leaving only the components 102 coupled by the tertiary connectors 108 therebetween. Advantageously, separation of the components 102 from the component tree 100 by the user may be simplified as a result of only having to separate each component 102 from any adjacent tertiary connectors 108 to which the component 102 is connected. The tertiary connectors 108 may secure and organize the components 102 in a predetermined order along the length of the component tree 100 without the primary connector 104 and the secondary connectors 106, thereby optimizing the case of use, efficiency, and cost-effectiveness of the component tree 100.

The component tree 100 may be included with a product to be assembled by a user. As one example, the component tree 100 may be included with the shelf product 110. The shelf product may include a plurality of shelves 152, a plurality of poles 154 for connecting the plurality of shelves 152, and the component tree 100. The component tree 100 may include the components 102 used to assemble the shelf product 110 and the components 102 may be positioned along the length 112 of the component tree 100 in a predetermined order.

As shown in FIG. 7, the assembled shelf product 110 may include the plurality of shelves 152, the plurality of poles 154, the interlocking tees 124 configured to secure one shelf product 110 to another shelf product 110, the top caps 126 configured to removably connect to a top shelf of the plurality of shelves 152, the adjustable feet 128 configured to connect to a bottom shelf 156 of the plurality of shelves 152, the foot adjusters 130 configured to be inserted into the plurality of poles 154 and secured to the adjustable feet 128 (the foot adjusters 130 are not shown because they are inserted into the poles 154 connected to the bottom shelf 156), and the wall bracket 132 configured to secure the shelf product 110 to a wall or other surface. It should be appreciated that, although a shelf product 110 is shown in FIG. 7, the component tree 100 may hold any suitable components 102 for assembling any desired product.

More than one component tree 100 may be included with a product, as determined by a skilled artisan. Each component tree 100 may be the same, or each component tree 100 may be different. In certain embodiments, one or more component tree 100s may be integrally formed with a product or with an element or section of a product. In one non-limiting example, a component tree 100 may be integrally formed with one or more shelves of the plurality of shelves.

Figure 8A:
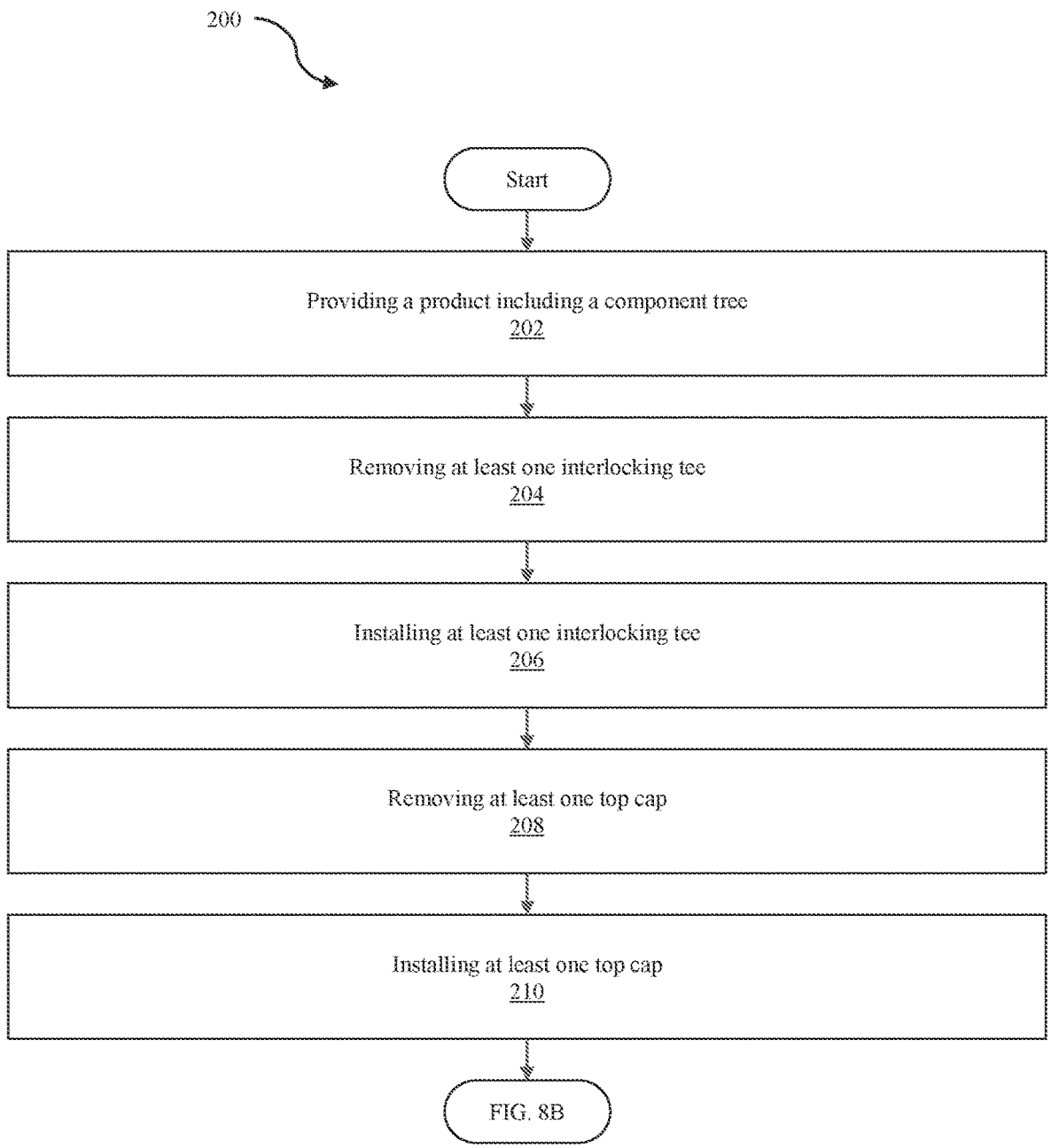
FIGS. 8A and 8B are a flowchart that describes a method of using the component tree, according to certain embodiments of the present disclosure.
Figure 8B:
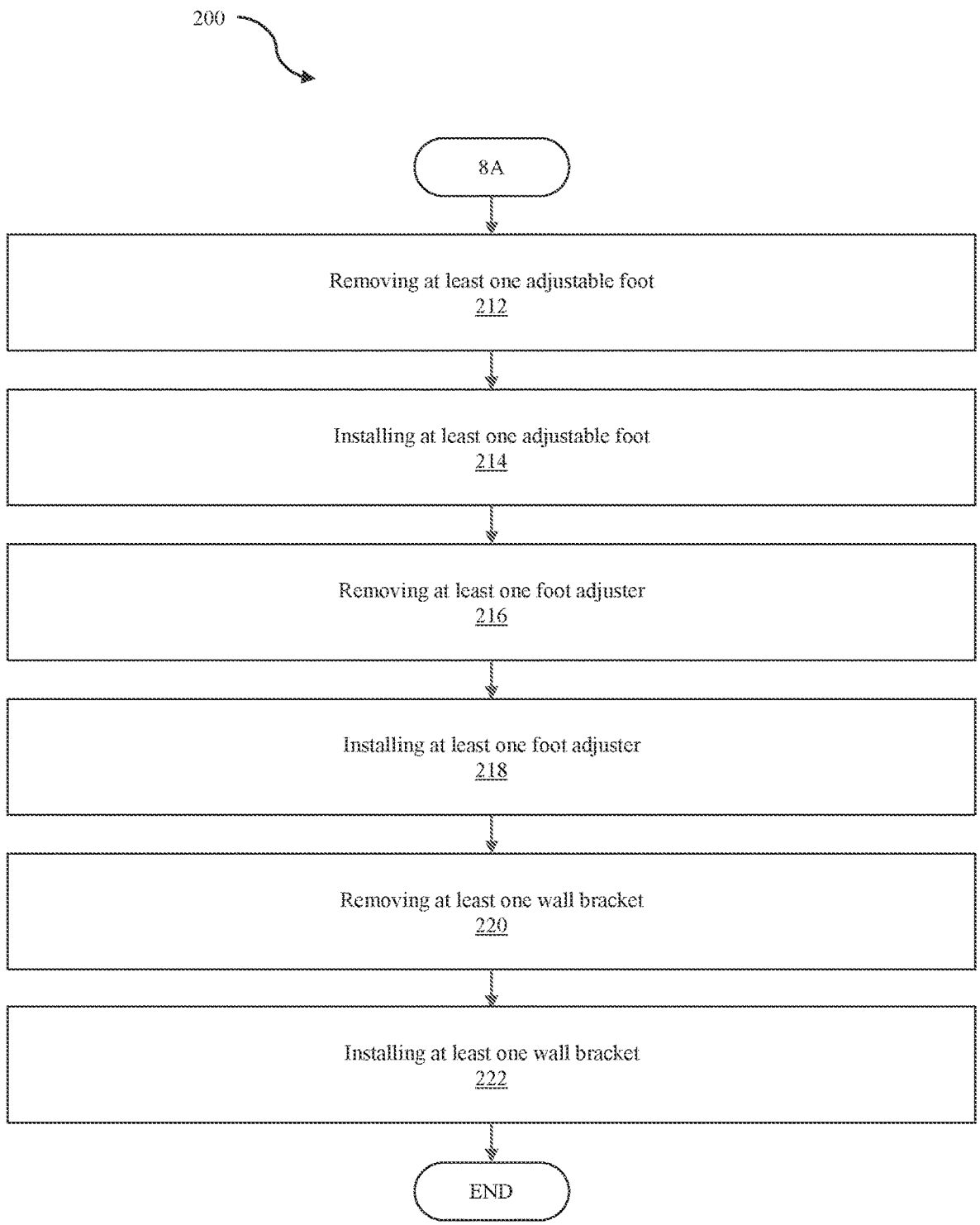

FIGS. 8A and 8B are a flowchart that describes a method 200 of using the component tree 100 to assemble a product, according to certain embodiments of the present disclosure. In a first step 202, a product including a component tree 100 may be provided. In a second step 204, a user may remove a first component 114 from a first end 116 of the component tree 100. In a third step 206, the user may install the first component 114 on the product. In a fourth step 208, the user may remove a second component 118 from the component tree 100. In a fifth step 210, the user may install the second component 118 on the product. In a sixth step 212, the user may remove a third component 120 from the component tree 100, and in a seventh step 214, the user may install the third component 120 on the product.

It should be appreciated that any suitable number of steps required to complete assembly of a product may be included in the method 200, including additional steps relating to removing additional components 102 from the component tree 100, installing additional components 102 on a product, and general assembly of the product, as non-limiting examples. One or more steps included in the method 200 may be repeated, omitted, or performed in any desirable alternative order, as needed.

In certain more particular embodiments, the method 200 may include the first step 202 of providing a product including a component tree 100. In the second step 204, the user may remove an interlocking tee 124, from the component tree 100. In the third step 206, the user may install the interlocking tee 124 on the product. In the fourth step 208, the user may remove a top cap 126 from the component tree 100. In the fifth step 210, the user may install the top cap 126 on the product. In the sixth step 212, the user may remove an adjustable foot 128 from the component tree 100, and in the seventh step 214, the user may install the adjustable foot 128 on the product. An eighth step 216 may include removing a foot adjuster 130 from the component tree 100, and a ninth step 218 may include installing the foot adjuster 130 on the product. A wall bracket 132 may be removed from the component tree 100 in a tenth step 220, and in an eleventh step 222, the wall bracket 132 may be installed on the product.

Figure 9:
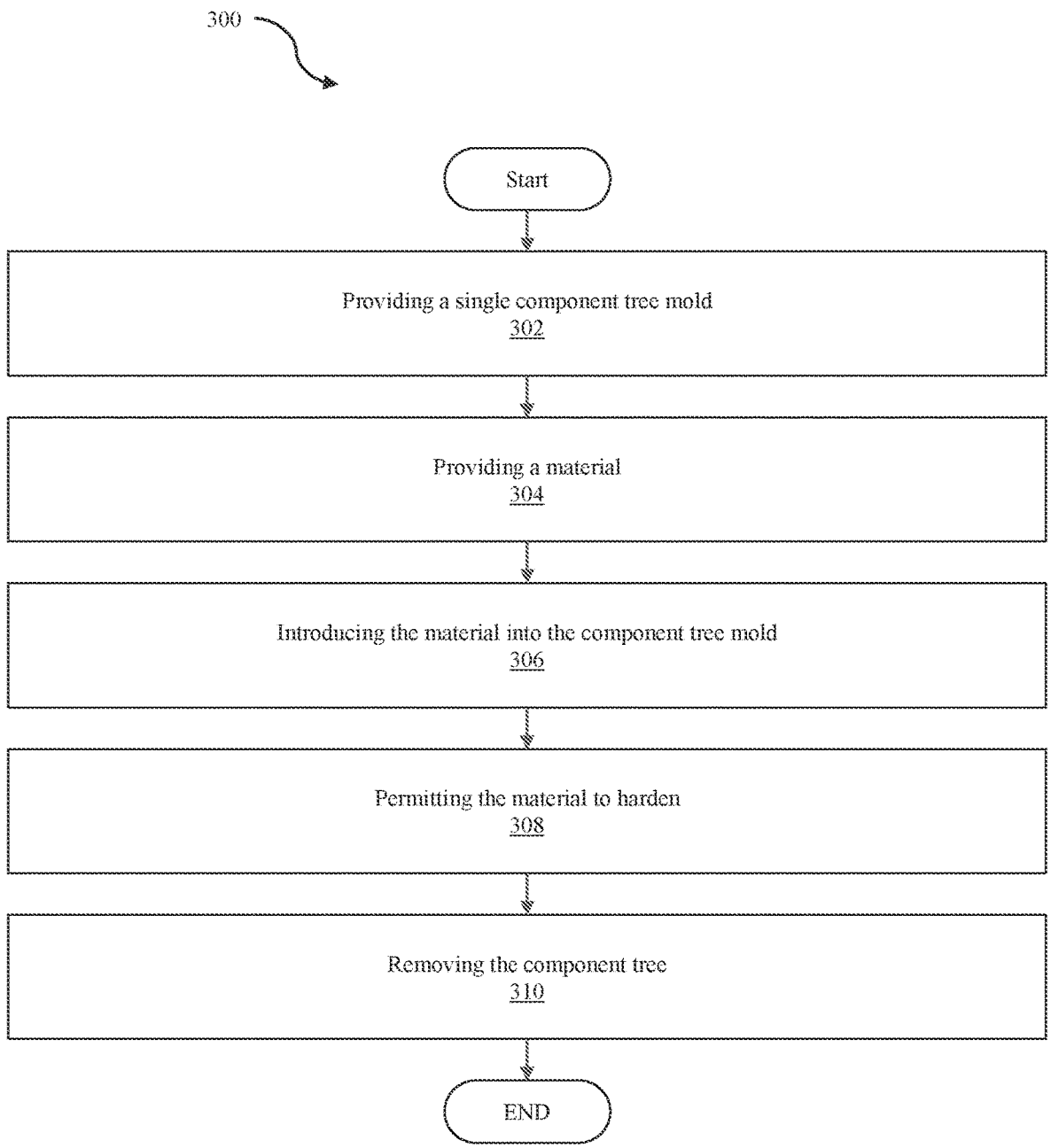
FIG. 9 is a flowchart that describes a method of manufacturing a component tree, according to certain embodiments of the present disclosure.

FIG. 9 is a flowchart that describes a method 300 of manufacturing a component tree 100, according to certain embodiments of the present disclosure. A first step 302 may include providing a single component tree mold 158. A second step 304 may include providing a material, such as a molten melt material in one non-limiting example, and a third step 306 may include introducing the material into the component tree mold 158 using an injector nozzle positioned to achieve a balanced fill of the plurality of cavities 164 of the component tree mold 158. A fourth step 308 may include permitting the material to harden into the component tree 100, and a fifth step 310 may include removing the component tree 100 as a single unit from the component tree mold 158.

The method 300 may also include performing additional steps, as determined by a skilled artisan. It should be appreciated that steps relating to forming the component tree mold 158, positioning the component tree mold 158 with respect to one or more injector nozzles, introducing the material into the component tree mold 158, permitting the material to flow through the component tree mold 158, permitting the material to harden into the component tree 100, removing the component tree 100 from the component tree mold 158, and any other desirable steps may be included in the method 300. One or more steps included in the method 300 may be repeated, omitted, or performed in any desirable alternative order, as needed.

Figure 10:
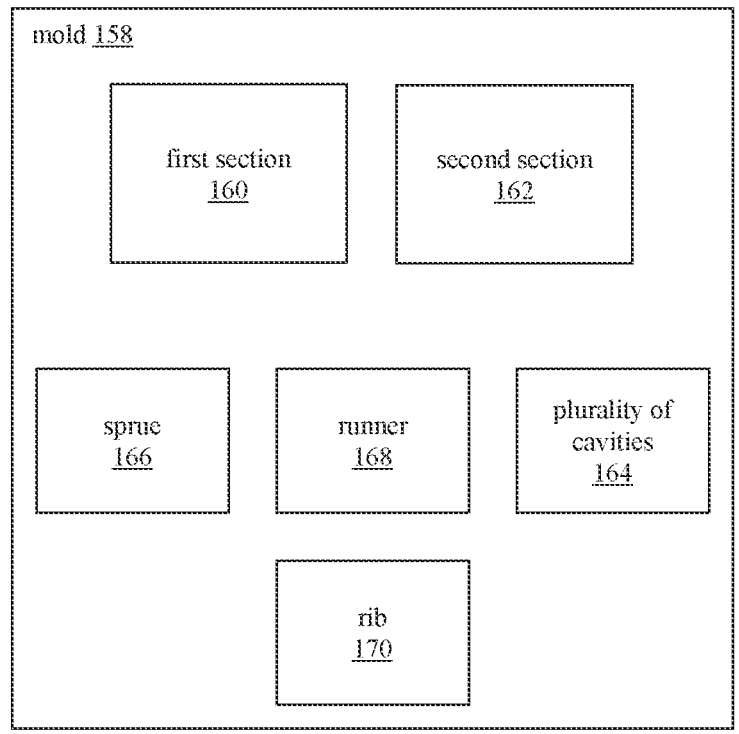
FIG. 10 is a block diagram that describes a component tree mold, according to certain embodiments of the present disclosure.

FIG. 10 is a block diagram describing a component tree mold 158 configured to form a component tree 100, according to certain embodiments of the present disclosure. The component tree mold 158 may be a single mold rather than a series of molds. The component tree mold 158 may include a first section 160 and a second section 162. The first section 160 and the second section 162 may be configured to cooperate to form a plurality of cavities 164 therebetween. A sprue 166 may be configured to receive a material from an injector nozzle. A runner 168 may be in fluid communication with the sprue 166, the cavities 164, and a rib 170. In certain embodiments, the runner 168 may be configured to guide the material from the sprue 166 to the plurality of cavities 164. The rib 170 may fluidly couple one cavity 164 to another cavity 164. The rib 170 may only be in fluid communication with the runner 168 by way of the cavities 164.

In certain embodiments, the material may first travel from the sprue 166 to the runner 168, and through a cavity 164 before entering the rib 170. The component tree mold 158 may include a plurality of ribs 170, each rib 170 fluidly coupling one cavity 164 of the plurality of cavities 164 to another cavity 164 of the plurality of cavities 164. The plurality of ribs 170 may only be in fluid communication with the runner 168 by way of the plurality of cavities 164.

The component tree mold 158 may further include a gate disposed between each cavity 164 and the runner 168. The gate may be configured to have a decreased width or diameter relative to the runner 168 and at a point of fluid communication between the cavity 164 and the runner 168. Likewise, each rib 170 may have a first end and a second end including a gate having a decreased width or diameter relative to a central portion of the rib 170 and at a point of fluid communication between the cavity 164 and the rib 170. In some embodiments, the component tree mold 158 may include more than one sprue 166 configured to receive the material from more than one injector nozzle. It should be appreciated that any suitable number of first sections 160, second sections 162, cavities 164, sprues 166, runners 168, ribs 170, and gates may be included in the component tree mold 158, as determined by one of skill in the art.

The component tree mold 158 may be configured to form a component tree 100 when material is injected from the injector nozzle into the component tree mold 158 and the material solidifies. More specifically, the material that solidifies in the sprue 166 and the runner 168 may form the primary connector 104 and the secondary connectors 106, the material that solidifies in the plurality of cavities 164 may form the components 102, and the material that solidifies in the ribs 170 may form the tertiary connectors 108 of the component tree 100. In some embodiments, the material may be a molten material and may include a thermoplastic melt material. In one non-limiting example, the thermoplastic melt material may include propylene. In certain embodiments, the propylene may include a polypropylene copolymer. However, as would be apparent to someone of ordinary skill in the art, the molten melt material may comprise any appropriately desired molten melt material for forming a component tree 100.

In certain embodiments, the runner 168 may include a circular cross-section. The horizontal rib 170 may include a polygonal cross-section. One of ordinary skill in the art may select any suitable shape and configuration for the runner 168 and the rib 170, as desired. It should be appreciated that the component tree mold 158 may include any number of desired elements and features for molding a component 102 or a series of components 102. In one non-limiting example, the component tree mold 158 may include a multiple part mold that may be used to form different components 102 used in assembling a product, such as a shelf product 110.

The plurality of cavities 164 may be disposed laterally along a length of the of the component tree mold 158. Each cavity 164 may be configured to form a component 102 of a component tree 100 used to assemble the product. The cavities 164 may be sequentially located along the length of the component tree mold 158, such that a first cavity at a first end of the component tree mold 158 may be configured to form the first component 114 used to assemble the product, and a second cavity positioned adjacent to the first cavity and inwardly from the first end may be configured to form the second component 118 used to assemble the product. A third cavity positioned adjacent to the second cavity and inwardly from each of the second cavity and the first cavity may be configured to form the third component 120 used to assemble the product, and so on down the length of the component tree mold 158 from the first end to a second end of the component tree mold 158.

The plurality of cavities 164 may be configured to form a plurality of components 102 selected from a group. For example, the first cavity may be configured to form an interlocking tee 124, the second cavity may be configured to form a top cap 126, the third cavity may be configured to form an adjustable foot 128, a fourth cavity may be configured to form the foot adjuster 130, and a fifth cavity may be configured to form the wall bracket 132. It should be appreciated that a person skilled in the art may include any suitable number of cavities 164 configured to produce any number and configuration of desired components 102 in any predetermined order.

In certain more particular embodiments, the component tree mold 158 may include a central cavity positioned at an approximate center of the runner 168 and configured to form the wall bracket 132. Each of the first end of the component tree mold 158 and the second end of the component tree mold 158 may include a first cavity configured to form an interlocking tee 124 in an outermost position along the length of the component tree mold 158, a second cavity configured to form a top cap 126 positioned adjacent to and inwardly from the first cavity, a third cavity configured to form an adjustable foot 128 positioned adjacent to and inwardly from the second cavity, and a fourth cavity configured to form the foot adjuster 130 positioned adjacent to and inwardly from the third cavity. Advantageously, the sequential order of the cavities 164 along the length of the component tree mold 158 may result in a component tree 100 that may facilitate easy and precise assembly and optimize compliance with assembly instructions and steps. A skilled artisan may include any suitable number of cavities 164 and arrange the cavities 164 in any suitable order along the length of the component tree mold 158, as desired. In certain embodiments, the molded components may be included with the product to be assembled.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A component tree comprising:
    a plurality of components, the plurality of components including an interlocking tee, a top cap, an adjustable foot, a foot adjuster and a wall bracket; and
    a plurality of connecting means configured to couple each component of the plurality of components to an adjacent component of the plurality of components,
    wherein the plurality of components is sequentially positioned along a length of the component tree in a predetermined order.

2. The component tree of claim 1, wherein the plurality of connecting means includes a primary connector, a plurality of secondary connectors, and a plurality of tertiary connectors.

3. The component tree of claim 1, wherein the interlocking tee includes a first sidewall, a second sidewall, a bottom end, a top end, a first central recessed portion and a second central recessed portion.

4. The component tree of claim 3, wherein a first point of attachment between the interlocking tee and a first connecting means is disposed on the top end of the interlocking tee and a second point of attachment between the interlocking tee and a second connecting means is disposed on the first sidewall of the interlocking tee.

5. The component tree of claim 1, wherein the top cap includes a top element and a protrusion extending outwardly from the top element.

6. The component tree of claim 5, wherein a first point of attachment between the top cap and a first connecting means is disposed on the top element of the top cap and a second point of attachment between the top cap and a second connecting means is disposed on the top element of the top cap.

7. The component tree of claim 1, wherein the adjustable foot includes a circular base section having a cylindrical sidewall extending outwardly from the circular base section, and wherein the cylindrical sidewall has an internal surface having a threaded portion configured to couple to the foot adjuster.

8. The component tree of claim 7, wherein a first point of attachment between the adjustable foot and a first connecting means is disposed on the circular base section of the adjustable foot and a second point of attachment between the adjustable foot and a second connecting means is disposed on the circular base section of the adjustable foot.

9. The component tree of claim 1, wherein the foot adjuster includes a cylindrical body having an external surface including a threaded portion configured to couple to the adjustable foot and a non-threaded portion.

10. The component tree of claim 9, wherein a first point of attachment between the foot adjuster and a first connecting means is disposed on the non-threaded portion of the foot adjuster and a second point of attachment between the foot adjuster and a second connecting means is disposed on the non-threaded portion.

11. The component tree of claim 1, wherein the wall bracket includes a semi-cylindrical body disposed between a first end and a second end, and the wall bracket includes an outer surface and an inner surface configured to abut of a product and a wall.

12. The component tree of claim 11, wherein a first point of attachment between the wall bracket and a first connecting means is disposed on the outer surface and a second point of attachment between the wall bracket and a second connecting means is disposed on the outer surface.

13. The component tree of claim 1, wherein the interlocking tee is disposed at an end of the component tree.

14. The component tree of claim 13, wherein the top cap is disposed inwardly from and adjacent to the interlocking tee.

15. The component tree of claim 14, wherein the adjustable foot is disposed inwardly from and adjacent to the top cap.

16. The component tree of claim 15, wherein the foot adjuster is disposed inwardly from and adjacent to the adjustable foot.

17. The component tree of claim 1, wherein the wall bracket is disposed centrally along a length of the component tree.

18. The component tree of claim 1, wherein a first interlocking tee is disposed at a first end of the component tree, a second interlocking tee is disposed at a second end of the component tree, a first top cap is disposed inwardly from and adjacent to the first interlocking tee, a second top cap is disposed inwardly from and adjacent to the second interlocking tee, a first adjustable foot is disposed inwardly from and adjacent to the first top cap, a second adjustable foot is disposed inwardly from and adjacent to the second top cap, a first foot adjuster is disposed inwardly from and adjacent to the first adjustable foot, and second foot adjuster is disposed inwardly from and adjacent to the second adjustable foot, and the wall bracket is disposed centrally along a length of the component tree.

19. A method of using a component tree, comprising the steps of:
   providing a product including a component tree having
      a plurality of components, the plurality of components including an interlocking tee, a top cap, an adjustable foot, a foot adjuster and a wall bracket, and a plurality of connecting means configured to couple each component of the plurality of components to an adjacent component of the plurality of components, wherein the plurality of components is sequentially positioned along a length of the component tree in a predetermined order;
   removing the interlocking tee;
   installing the interlocking tee;
   removing the top cap;
   installing the top cap;
   removing the adjustable foot;
   installing the adjustable foot;
   removing the foot adjuster;
   installing the foot adjuster;
   removing the wall bracket; and
   installing the wall bracket.

20. A method for manufacturing a component tree, comprising the steps of:
   providing a single component tree mold;
   providing a material;
   introducing the material into the component tree mold;
   permitting the material to harden into the component tree; and
   removing the component tree from the component tree mold.

* * * * *